(12) United States Patent
Sommer

(10) Patent No.: US 6,340,715 B1
(45) Date of Patent: Jan. 22, 2002

(54) FOAMABLE COMPOSITION ADAPTED FOR DELIVERY FROM PRESSURIZED CONTAINERS, FOR PRODUCING INSULATING FOAMS

(75) Inventor: Heinrich Sommer, Appenzell (CH)

(73) Assignee: Rather AG, Appenzell (CH)

( * ) Notice: Subject to any disclaimer, the term of this patent is extended or adjusted under 35 U.S.C. 154(b) by 0 days.

(21) Appl. No.: 09/571,533

(22) Filed: May 16, 2000

(30) Foreign Application Priority Data

Jan. 7, 2000 (DE) .......................................... 100 00 327

(51) Int. Cl.⁷ .................................................. C08J 9/04
(52) U.S. Cl. ....................... 521/114; 222/206; 222/630; 425/4 R; 521/142; 521/146; 521/149; 521/155
(58) Field of Search .................................. 521/142, 146, 521/149, 155, 114; 222/206, 630; 425/4 R

(56) References Cited

U.S. PATENT DOCUMENTS 6,057,376 A * 5/2000 Bass et al. .................. 521/130

* cited by examiner

*Primary Examiner*—John M. Cooney, Jr.
(74) *Attorney, Agent, or Firm*—Reed Smith Hazel & Thomas LLP

(57) ABSTRACT

The invention provides a pressurized container for providing insulating foams including a foamable composition adapted for delivery from pressure cans and on the basis of an aqueous plastic dispersion, which comprises an aqueous dispersion of at least one film forming plastic with a content of 30 to 80% by weight of film forming aqueous plastic dispersion, a blowing gas in an amount equal to 3 to 25% of the weight of the total composition, and at least one anionic foam stabilizer for stabilizing the foams and emulsifying the blowing gas in the aqueous plastic dispersion in an amount equal to 0.3 to 6% of the weight of the total composition. The foamed compositions are able to be employed as sealing, caulking and insulating materials.

17 Claims, No Drawings

FOAMABLE COMPOSITION ADAPTED FOR DELIVERY FROM PRESSURIZED CONTAINERS, FOR PRODUCING INSULATING FOAMS

BACKGROUND OF THE INVENTION

1. Field of the Invention

The present invention relates to a pressurized container for providing insulating foams including a foamable composition adapted for delivery from the pressurized container, for producing stable insulating foams, on the basis of an aqueous plastic dispersion. The composition is more particularly suitable for the production of insulating foams for constructional purposes.

2. Description of the Related Art

The composition of the invention serves for the production of insulating foams, which are more especially employed for thermal and humidity-proofing insulation by caulking or filling cavities. The principal applications are in the constructional industry, but also in the form of industrially employed products, for example for caulking cavities to avoid spaces likely to collect condensed water. Furthermore this composition may be utilized for the production of seals, as for example sealing tapes.

It is more especially in the construction sector that polyurethane foams are employed on an extensive scale, which are produced and worked by delivery of a prepolymer composition from pressure containers, as for instance aerosol cans, with the aid of propellants on site with a bulk weight of 10 to 100 g/l. So-called single component foams are moisture curing, that is to say same consist of a component able to react with atmospheric humidity, namely isocyanate groups. Dual component foams contain a reaction partner in the form of a second component so that curing to yield the finished foam does now not depend, or does not solely depend, on the presence of atmospheric humidity. Here as well the reactive first component comprises isocyanate groups, which react with the hydroxy or amine group present in the second component.

The prepolymers containing isocyanate groups utilized for the production of conventional polyurethane foams possess a special suitability for the production of stable foams but have one substantial disadvantage, namely the toxicity of the isocyanate containing components. This renders necessary the application of special precautionary measures for the filling and processing and for the disposal of residues. On the other hand installed PUR foams possess excellent insulating properties, they are not toxic and have good processing properties.

Compositions, which contain polyurethane prepolymers, are highly water-reactive. For this reason systems, which contain such prepolymers, can not be produced on an aqueous basis. Other liquid components, solvents and/or liquid additives, must consequently be used as vehicles for the foam forming components. For the selection of the vehicle components rigid limits are imposed owing to the reactivity of the isocyanate groups. Seen in this light it would be desirable to make foam forming polymers available able to be foamed from an aqueous dispersions.

The U.S. Pat. No. 3,912,666 discloses formulations of film forming polymers together with blowing gases for the production of foam pads. The formulation disclosed here has a non-ionic foam stabilizer added to it. The foam is described as being non-tacky, this being consistent with the use for cleaning purpose named.

The U.S. Pat. No. 4,036,673 describes a method for the production of adhesive foams with the aid of blowing gases from an aqueous dispersion, which collapses after its formation.

Furthermore several plastic dispersions are on the market, which together with blowing gas are held in a pressure package and which after delivery and foaming provide a stable foam in a short time. The product is conceived as a "tire patch"; the foam spreads over the wall of the tire, collapses as a film and seals off punctures. Such a formulation is for instance described in the U.S. Pat. No. 4,501, 825.

The film forming mechanism is well described in the literature, see "Water borne Coatings" by K. Dören et al., Hansa Publishers, Munich, 1994. It is furthermore a known practice to control film formation by additives, such as associative thickeners, film formation adjuvants, fillers and the like, more particularly with a view to optimizing properties, for example in the case of products in the paint and coatings industry, see "Wässrige Polymerdispersionen, Syntheseeigenschaften—Anwendung" by D. Distler, Wiley-VCH Publishers, 1999. The production of foams and the theory of foam stabilization is also well documented in the literature and more particularly also the production of aqueous foams, see "Handbook of Aerosol Technology", pages 358 ff and "Aqueous Aerosol Films", P. A. Sanders, Krieger Publishing, Florida 1979.

Latex foams have been described in various connections for pressure can applications. The patent publication WO-A-98/12 248 describes foamable compositions for delivery from pressure cans in the form of stable foams, which consist of an aqueous emulsion of a film forming polymer, a liquid blowing agent and a solid, lipophilic and non-ionic surfactant with a HLB value of approximately 3 through 8 and possibly further additives. The patent publication WO-A-98/12 247 describes a foamable composition for pressure can delivery, which contains an aqueous emulsion, a film forming polymer, a liquid blowing agent, a solid, wax-like foam stabilizer and a liquid lipophilic surfactant.

It has been shown that while the foamable compositions described in the two last mentioned publications provide a stable foam immediately after delivery, this foam collapses in the course of time and does not do justice to the requirement to be met by a satisfactory insulating foam on a long term basis. The pronounced tendency to shrink may admittedly be mitigated by the systematic selection of non-ionic surfactants as foam stabilizers, but it may not be completely overcome. Moreover, the presence of non-ionic surfactants leads to the instability of the resulting foams when affected by humidity, as for instance under conditions of high atmospheric moisture.

However there is a need for a small celled, elastic, non-shrinking foam.

SUMMARY OF THE INVENTION

The present invention provides a small celled, elastic, non-shrinking foam produced with the aid of a conventional blowing mixture from an aqueous dispersion of a film forming plastic. More particularly there is a requirement for such a polyurethane foam.

This aim is to be attained with a composition, which comprises an aqueous dispersion of at least one film forming plastic with a content of 30 to 80% by weight of the film forming plastic, a blowing gas in an amount equal to 3 to 25% of the weight of the total composition, and one or more anionic foam stabilizers in an amount equal to 0.3 to 6% of the total composition.

DESCRIPTION OF THE PREFERRED EMBODIMENTS

The composition in accordance with the invention for the delivery of foams from pressure packages differs from the compositions in accordance with the prior art by the presence, more particularly, of an anionic foam stabilizer in a quantity of between 0.3 and 6% by weight. A fine-celled, elastic and substantially dimensionally stable foam is produced, which also behaves in an essentially inert manner toward the influences of humidity.

In addition to their foam stabilizing effect the anionic foam stabilizers employed in accordance with the invention perform a further function, namely the integration of the blowing gases in the aqueous phase. The model is the formation of an oil-in-water emulsion, i. e. the low molecular blowing gases are emulsified in the aqueous medium. It is assumed that for the formation of emulsified blowing gases in the aqueous phase in addition to the dispersed polymer particles furthermore emulsified blowing gas spherules are present.

The principal function of the stabilizers is guaranteeing foam stability during the film forming process and during drying. Anionic, water soluble foam stabilizers or, respectively, surfactants are generally suitable which, after foam formation caused by the blowing gas, form Langmuir films at the interface of the continuous aqueous phase with the disperse gas phase. Surprisingly, the stabilizing effect of anionic surfactants is clearly superior to that of non-ionic or cationic surfactants, more especially as regards the foam yield and long term stabilization.

The aqueous plastic dispersions employed will generally comprise an amount of the film forming plastic or plastics equal to 30 to 80%, preferably 35 to 70% and more particularly 40 through 60% of the weight of the dispersion. In general film forming plastics will be those, which possess a minimum film forming temperature of less than 100° C., and more particularly those with a minimum film forming temperature of less than 50° C. Suitable film forming plastics, which may be employed as latex, alone or in admixture, include those on the basis of acrylic acid, low alkyl acrylates, styrene, vinyl acetate and the like. Ethylene based polymers may also be utilized, as may be styrene-acryl copolymers, styrene-butadiene copolymers, or vinyl acetate-ethylene copolymers. More particularly preferred is the use of polyurethane latices, either alone or in conjunction with the above mentioned latices. In the case of the aqueous plastic dispersions employed it will be a question of those which are commercially available. Basically, conventional latices, and more especially those for the production of coatings, are suitable for use in compositions of the invention. A list by way of example is to be found in the U.S. Pat. No. 4,381,066.

The present invention is described in further detail below with reference to preferred embodiments in conjunction with the accompanying tables. It should be understood that the preferred embodiments described below is provided only for illustrative purposes and the present invention is not limited to the details of these specific embodiments.

As regards the above mentioned polyurethane latices it is to be noted that owing to their hydrophilic and hydrophobic units present in the molecule they form extremely stable dispersions, which are practically able to do without further stabilizers. This applies both for polyurethanes on the basis of aromatic and also aliphatic polyisocyanates, irrespectively of whether they are cross-linked with polyether glycols or polyester glycols. Polyurethane latices are, in the context of the anionic foam stabilizers employed in accordance with the invention, furthermore in a position of integrating blowing gases such as liquefiable hydrocarbons, dimethyl ethers or liquefiable fluorocarbons in a sufficient amount in the aqueous dispersion and of distributing it extremely finely so that a decidedly fine-celled, elastic and nevertheless dimensionally stable foam is formed. Since aqueous polyurethane dispersions substantially stabilize themselves, it is as a rule possible to do without the addition of conventional emulsifiers.

It is possible with advantage to employ mixtures of different latices in the compositions in accordance with the present invention. This applies more particularly as well for such latices, which differ as regards their minimum film forming temperature, because it has been found that in the case of minimum film forming temperatures below room temperature extremely fine-celled, softly elastic foams are produced, whereas in the case of a minimum film forming temperature above room temperature fine-celled foams are produced, which after drying overnight tend to be brittle. The combination of a latex with a film forming temperature of 20° C. or less and more especially $\leq 0°$ C., with a latex with a minimum film forming temperature above 20° C. leads to a substantial compensation of the properties so that a fine-celled, elastic, dimensionally stable and readily processed foam is obtained. As a rule such mixtures should comprise both components in a weight ratio of between 30/70 and 70/30.

The compositions of the invention may contain conventional additives, as for example flame retardants, thickeners, biocides, fungicides, algicides, anti-freeze agents, anti-corrosion agents, emulsifiers, fillers, film forming adjuvants, and the like. In this respect it is a question of such additives as are conventional for the production of insulating foams, aqueous dispersions and for the use of certain compositions intended for delivery from pressure containers.

As a flame retardant it is possible to employ conventional flame retardants as employed in insulating foams subject to the proviso that same are miscible with the aqueous dispersion. Preferred flame retardants are dispersions of polymer-based flame retardants, as for instance PVC dispersions, polyvinyidene chloride dispersions or also such polychloroprene latices as are commercially available.

An adjuvants for thickening the latices it is possible to utilize thickeners as are for example employed for aqueous paints. Thickening may be more particularly necessary, if solids such as conventional halogen-free flame retardants (ammonium polyphosphates, aluminum hydroxide, boron salts) or furthermore other functional additives such as fungicides, insecticides, algicides and the like are to be utilized. Suitable thickeners are for example cellulose derivatives such as Methoce® 288, Methoce® A, Methoce® 311 (DOW Chemical), acrylate thickeners for aqueous systems, as for instance A P1/1(Münsing-Chemie) and Mirox AM (Stockhausen), polyurethane thickeners for aqueous systems, as for example Tafigel® PUR 40, Tafigel® PUR 55 (Münsing-Chemie), as well as inorganic thickeners such as bentonite, hectorite, montmorillonite, silicic acids (Aerosil® 200, supplied by the Degussa Company).

It is more especially the thickeners on the basis of short chained polyurethanes, as for example the Tafigel types, which favor the formation of stable foams and are of assistance in the formation of a homogeneous cell structure in the case of the use of low viscosity raw materials. Good stability is more particularly required for foam caulking vertical joints.

The combination of dispersion of film forming polymers on a non-polyurethane basis yields compositions, which in quality approach polyurethane dispersions for foam formation. Owing to the formation of stable structures in aqueous systems it is possible in the case of the use of polyurethane thickeners furthermore to partly or completely do without the addition of conventional emulsifiers.

For special applications it is possible for the foams to have conventional biocides added to them, as for example to halt or preclude insect damage, the growth of algae or attack by fungi.

Since it must be assumed that the compositions of the invention will have to be stored under unfavorable conditions for long periods of time prior to use, it may be as well to add conventional anti-freeze agents and anti-corrosion agents. Examples here are ethylene glycol, propylene glycol and diethylene glycol. Suitable anti-corrosion agents are alkanolamines.

Further additives are constituted by film forming adjuvants, with which the minimum film forming temperature may be reduced and may be selected on the basis of affinity or abhorrence for water of the film forming polymers utilized in accordance with the Diestler method, as for instance Texanol®, propylene glycol, Dowanol® DPM.

Since in the case of the plastic dispersions it is question of aqueous systems with a high water content, it may be necessary to add adjuvants, which ensure the solubility or, respectively, dispersibility of the additives and blowing gases and the formation of a homogeneous and stable phase. The model is the formation of an oil-in-water dispersion, i.e. the low molecular blowing agents and the additives are emulsified in the aqueous medium.

In the case of the use of polyurethane dispersions it is possible to substantially dispense with the use of emulsifiers. Otherwise such emulsifiers may be utilized, as are employed in the manufacture of plastic dispersions by emulsion polymerization, in pharmaceutical applications for the production of gels and cremes and for the solubilization of dyes. More particularly suitable are emulsifiers in the surfactant group. Examples of more particularly suitable emulsifiers are ethoxylated fatty alcohols, ethoxylated alkylphenols, ethoxylated fatty acids, alkyl sulfates, alkylether sulfates, cocobetaines, alkylamidopropylsulfobetains, alkyldimethylbenzyl ammonium bromides, sorbitan esters such as sorbitan monopalmitate, monostearate and monoleate, ethoxylated castor oil, ethoxylated hydrogenated castor oil and the like. Further non-ionic emulsifiers and protective colloids, which may be employed in combination with ionic emulsifiers as well, are for example polyvinylalkohols, polyvinylpyrrolidone and furthermore amphiphilic block copolymers of ethylene oxide and propylene oxide, as for instance Pluronics® of BASF or Synperonics® of ICI Surfactants.

In the case of the anionic foam stabilizers it will generally be a question of soaps and surfactants. They will be present in an amount equal to 0.3 to 6%, preferably 0.5 to 4% and more especially of 1 to 3%, in each case of the overall composition. Substances coming into question will be preferably soaps, such as ammonium, sodium and potassium soaps, and more particularly ammonium or sodium stearate, laurate myristate and palmitate.

Further suitable substances are derivatives of fatty acids of the general formula RCO—N (CH$_3$)CH$_2$COONa, RCO denoting a lauric, myristic, palmitic, stearic or oleic acid radical. These fatty acid derivatives are generally known as sarcosinates.

Furthermore fatty acid ethercarboxylates of the general formula R—(OCH$_2$CH$_2$)$_n$—OCH$_2$COONa can be employed, R denoting a fatty alkyl radical. Suitable substances are x-sulfo-fatty-acid ethyl esters, fatty alkyl sulfates, fatty alkylether sulfates, alkyl phosphates and alkylether phosphates, alkylbenzene sulfonates, olefine sulfonates, alkane sulfonates and furthermore sulfosuccinic acid esters or sulfosuccinic acid esters of fatty acid alkanolamides.

In the case of the alpha sulfo-fatty acid esters those of the formula RCH(SO$_3$H)(COOCH$_3$) are preferred, wherein R denotes a fatty acid radical, or, respectively, the salts thereof. In the case of fatty alkyl sulfates the following are particularly preferred: Stokal® SAF, an ether sulfate selected from C$_{12}$—C$_{15}$ fatty alcohol ethoxylates with 2 to 3 ethylene oxide units, such as of the formula C$_{12}$H$_{25}$(OCH$_2$CH$_2$)$_{2-3}$OSO$_3$H as the sodium salt.

In the case of the alkyl phosphates and alkylether phosphates it is a question of commercially available ones, this also applying for alkylbenzene sulfonates, of which dodecylbenzene sulfonate is preferred. In the case of the olefine sulfonates the C$_{14}$ and C$_{16}$ homologues and in the case of alkane sulfonates those with 13 to 18 carbon atoms are preferred. It may be generally said that in the case of the fatty acid derivatives more particularly those with 10 to 20 carbon atoms come into question.

More particularly preferred anionic foam stabilizers are soaps and fatty alcohol sulfates (for example products of the Stockhausen Company, Krefeld, Germany) which are supplied with the designations Stokal® STA and Sultafon® SAF. Fine regulation of the foam structure may be achieved using a combination of ammonium stearate and fatty alcohol sulfate.

The blowing gases employed in the compositions in accordance with the invention are those which are customarily employed for the production foam delivered from pressure containers. These coming into question are more particularly liquefiable blowing gases, such as propane, n-butane, isobutane, dimethylether, 1,1,1,2-tetrafluoromethane (R134a) and 1,2-difluoromethane (R152a) alone or admixed. More particularly preferred is a mixture of propane, isobutane and dimethylether. As supplements or as adjuvants it is possible to add further blowing gases such as CO$_2$ or N$_2$O. The blowing gas content of the overall composition will amount to 3 to 25% by weight, preferably up to 20% by weight and more especially up to 12% by weight. For the production of sealing foams and strands a blowing gas content of 3 to 5% by weight is generally quite sufficient. For the production of sealing foams the use of CO$_2$ as the major or sole blowing gas component is sufficient and preferred.

The latex types are selected on the basis of their film forming temperature. A film forming temperature of less than 100° C. is of predominant importance. The minimum film forming temperature may however also be reduced by the use of suitable film forming adjuvants so as to be in the desired range.

Particularly preferred is the use of polyurethane dispersions and furthermore dispersions of polyurethane and a further film former, such as of polyurethane acrylate combinations. For certain applications the use of hydrophobic film formers may be convenient, as for example those on an olefinic basis or with a high olefinic content, such as for example styrene butadiene copolymers and styrene acrylate copolymer. It has been found that in the case of the use of high contents of vinyl acetate-ethylene prepolymer there is a substantial water uptake potential, something which means that at high atmospheric humidities the foam formed draws in water to saturation and so starts to dissolve and softens.

This may lead to internal collapse of the metastable foam and to a loss of the desired thermal and acoustic insulating properties.

An overview of the latices able to be employed is given in table 1. As regards the polyurethane dispersions it is to be noted that for the production of UV resistant foams the use of polyurethane on the basis of aliphatic polyisocyanates is preferred.

The invention relates furthermore to pressure cans other packages filled with the above described composition for the delivery of insulating foams. In this respect it is a question of conventional aerosol or pressure cans as are employed world-wide for various purposes, including the production of single component polyurethane insulating foams on the basis of isocyanate copolymers. In order to improve the delivery of compositions stored in pressure cans for long periods of time it may serve a good purpose to include a delivery assisting means in the form of a metal rod or a steel ball, which facilitates the stirring or shaking of any dispersion which has settled out.

TABLE 1

| Latex | Solids % | MFBT* ° C. | pH | Viscosity, mPas | Source | Notes |
|---|---|---|---|---|---|---|
| Styrene-butadiene copolymers | | | | | | |
| Lipaton SB 4520 | 50 | 0 | 8.5 | 200 | Polymer-Latex, Marl | |
| Lipaton SB 5521 | 50 | 0 | 8.5 | 100 | Polymer-Latex, Marl | |
| Lipaton SB 5811 | 47 | 3 | 8 | 25 | Polymer-Latex, Marl | |
| Lipaton SB 5850 | 46 | 3 | 8 | 20 | Polymer-Latex, Marl | |
| DL 955 | 50 | 18 | 7 | 200 | Dow | |
| DL 980 | 50 | 0 | 5 | 250 | " | |
| Styrene-acrylate copolymer | | | | | | |
| Lipaton X 3820 | 50 | 4 | 7.5 | 160 | Polymer-Latex, Marl | |
| Lucidene 375 | 45 | 85 | 8.5 | 350 | Morton International, Bremen | |
| Vinyl acetate-ethylene copolymer | | | | | | |
| Vinnapas LL 7200 (Airflex 720) | 72 | | | 2300 | Air Products, Burghausen | |
| Polyurethane dispersion | | | | | | |
| U 500 | 40 | 0 | 7.4 | 400 | Alberdingk Boley, Krefeld | PUR/polyether |
| U 600 A | 40 | 0 | 8 | 300 | Alberdingk Boley, Krefeld | PUR/polyether |
| U 210 | 61 | 0 | 8 | 1000 | Alberdingk Boley, Krefeld | PUR/polyether |
| U 300 | 40 | 0 | — | — | Alberdingk Boley, Krefeld | PUR/polyether |
| U 650 | 40 | 0 | | — | Alberdingk Boley, Krefeld | PUR/polyether |
| Impranil DLNW 50 Acrylate dispersion | 50 | — | — | — | Bayer AG | PUR/polyether |
| AC 548 | 50 | 13 | 8 | 4500 | Alberdingk Boley, Krefeld | |
| AC 2535 | 50 | 20 | 7.5 | 3000 | Alberdingk Boley, Krefeld | |
| AC 31 | 50 | 40 | 7.5 | 1000 | Alberdingk Boley, Krefeld | |
| AC 2529 | 43 | 50 | 7 | 4500 | Alberdingk Boley, Krefeld | |
| AC 2509 | 50 | 80 | 7.5 | 500 | Alberdingk Boley, Krefeld Alberdingk Boley, Krefeld | |
| Acryl methacrylate dispersion | | | | | | |
| AC 548 | 50 | 13 | 8 | 4500 | Alberdingk Boley, Krefeld | |

*MFBT = minimum film forming temperature

The compositions in accordance with the invention are formulated as follows. The latex mixture is prepared and mixed by agitating vigorously with the foam stabilizers and any emulsifiers employed. In the case of the use of components not soluble in water, such components must be predissolved in organic solvents and then slowly added to the latex. The fact that then higher concentrations may be incorporated than would be expected judging from the solubility in water is probably to be attributed to the ability to form micells or, respectively, the incorporation of the surfactants in the lamellar layers of the dispersed polymer particles at the polymer water interface.

Suitable organic solvents for the aqueous dispersions in accordance with the invention have been found to be low molecular alcohols such as ethanol, propanol, isopropyl alcohol, butanol, isobutanol, tert.-butanol, ethylene glycol, isobutyl glycol, diethylene glycol, 1-methoxy2-propanol, 1-ethoxy-2-propanol and the like.

If solutions are necessary, they will be produced while hot. Many systems such as for instance 40% hexadecanoic acid in isopropanol are able to be processed after cooling down for only a few hours, since there is a substantial formation of micells and the formation of liquid crystalline structures. By heating and stirring it is possible for such structures to be degraded again.

It will be clear that the anionic surfactants may also be produced by neutralization of the corresponding acids in a basically set aqueous dispersion or in an aqueous dispersion of a film former with a basic function.

After the addition of the surfactants and any emulsifiers further additives are added and after filling and sealing of the pressure container the blowing gas is incorporated.

The invention will be explained with reference to the following examples.

EXAMPLES 1 THROUGH 7

Pressure cans were filled with compositions in accordance with the invention as indicated in table 2, sealed and tested after a few days of equilibration.

All compositions produced foams with a bulk density of approximately 100g/cc. The best results were obtained with compositions based on dispersions of polyurethanes or blends of polyurethanes. In this case the products were dimensionally stable, fine-celled, elastic foams with a good to very good tackiness.

Example 5 indicates that in the case of the use of a non-ionic foam stabilizer (Brij) the foam lacks the necessary permanence. After 24 hours the foam had collapsed so that the composition was unsuitable for foam caulking joints.

As a rule dispersions, which do not contain any polyurethane, lead to worse results, either because the foam shrank (example 3) or because it was brittle and crumbled (example 4). The tendency to crumble could however be compensated by the admixture of a polyurethane dispersion (example 7).

All foams possessed a satisfactory tackiness as regards wood and other materials. This is more particularly important for use in the constructional industry, where insulating foams are regularly utilized for caulking during the fitting of door and window frames. If the blowing gas content was set to be 3 to 5% by weight the compositions in accordance with the invention could be made to produce sealing strands as for example required in joints in buildings and also however in refrigerators.

TABLE 2

| Substance | 1 | 2 | 3 | 4 | 5 | 6 | 7 |
|---|---|---|---|---|---|---|---|
| U 210 | 82 | | | | | 88 | 85 |
| U 500 | | 82 | | | | | |
| U 600 A | | | | | | | 42 |
| AC 2529 | | | | 82 | | | 40 |
| DL 955 | | | 82 | | | | 2.5 |
| Stokal STA | 9 | 9 | 9 | 9 | | 9 | 2.5 |
| Sultafon SAF | | | | | | | |
| Brij 52 Solution | | | | | 3 | | 2.5 |
| Ethox. Nonylphenol | | | | | | | 3 |
| Propane | 2 | 2 | 2 | 2 | 2 | | 4 |
| Iso-butane | 3 | 3 | 3 | 3 | 3 | 3 | 2 |
| Dimethyl-ether | 4 | 4 | 4 | 4 | 4 | 3 | 4 |
| Sum | 100 | 100 | 100 | 100 | 100 | 100 | 100 |
| Cell appearance in 1 cm joint | fine cells | fine cells | fine cells, heavy shrink | fine cells | coll-apsed | com-pact fine cells | elastic |
| Elasticity | high | soft, un-elastic | brittle and crumbling | high | high | | |
| Tackiness | very good | very good | good | very good | very good | | |

U 600 A=polyurethane dispersion, Alberdingk Boley
U 210=polyurethane dispersion, Alberdingk Boley
U 500=polyurethane dispersion, Alberdingk Boley
Stokal STA (Stockhausen)=30% ammonium stearate in water
  Brij 52 (FLUKA)=cetyl alcohol, ethoxylated approx. EO units, 50% in isopropanol
DL 955=styrene-butadiene dispersion DOW Chemical
Sultafon SAF (Stockhausen)=30% fatty alcohol sulfate in water
AC 2529=polyacrylate dispersion, Alberdingk Boley

What is claimed is:

1. A pressurized container for providing insulating foams, comprising:
a foamable composition adapted to be delivered from the pressure container, on the basis of an aqueous plastic dispersion, wherein the composition includes at least one film forming aqueous plastic dispersion which has 30 to 80 weight % of film forming plastic, a blowing gas in an amount equal to 3 to 25% of the weight of the total composition, and at least one anionic foam stabilizer for stabilizing the foams and emulsifying the blowing gas in the aqueous plastic dispersion in an amount equal to 0.3 to 6% of the weight of the total composition.

2. The pressurized container as set forth in claim 1, wherein the aqueous plastic dispersion comprises 40 to 60% by weight of film forming plastic.

3. The pressurized container as set forth in claim 1, wherein a minimum film forming temperature amounts to less than 100° C.

4. The pressurized container as set forth in claim 1, wherein the minimum film forming temperature amounts to less than 50° C.

5. The pressurized container as set forth in claim 1, wherein the aqueous plastic dispersion comprises a polyurethane, a polyacrylate, a styrene-butadiene copolymer, a vinyl acetate-ethylene copolymer, an acryl-metacrylic acid copolymer or a mixture thereof.

6. The pressurized container as set forth in claim 5, wherein the aqueous plastic dispersion contains a mixture of a polyurethane and a further plastic.

7. The pressurized container as set forth in claim 5, wherein said dispersion comprises two film forming plastics with a mixing ratio by weight of between 30/70 and 70/30, of which the one possesses a minimum film forming temperature of 20° C. and the other possesses a minimum film forming temperature of more than 20° C.

8. The pressurized container as set forth in claim 1, wherein the foamable composition comprises at least one of additives in the form of flame retardants, thickeners, biocides, fungicides, algicides, anti-freeze agents, fillers, anti-corrosion agents, and emulsifiers in a total amount of up to 50% of the overall weight of the composition.

9. The pressurized container as set forth in claim 1, wherein the anionic foam stabilizer is selected from the group comprising carboxylates, derivatives of fatty acids, fatty alkylether carboxylates, alpha-sulfo-fatty acid methyl esters, fatty alkyl sulfates, fatty alkyl ether sulfates, alkyl phosphates, alkylether phosphates, alkylbenzene sulfonates, alkane sulfonates, olefine sulfonates, sulfosuccinic acid esters and/or sulfosuccinic acid esters of fatty acid alkano-lamides.

10. The pressurized container as set forth in claim 1, wherein the anionic foam stabilizer is present in an amount equal to 1.0 to 4.0% of the weight of the overall composition.

11. The pressurized container as set forth in claim 1, wherein the blowing gas is a mixture of liquefiable blowing gases.

12. The pressurized container as set forth in claim 11, wherein the liquefiable blowing gases are propane, isobutane and/or dimethylether.

13. The pressurized container as set forth in any one of the preceding claims, characterized in that the blowing gas comprises $CO_2$ and/or $N_2O$.

14. The pressurized container as set forth in claim 1, wherein the insulating foams are thermal insulating foams.

15. The pressurized container as set forth in claim 1, wherein the foams are used for sealing.

16. The pressurized container as set forth in claim 1, wherein the pressurized container is a pressure can.

17. A pressurized container as set forth in claim 1, the pressurized container includes a steel ball.

* * * * *